United States Patent
Kang et al.

(10) Patent No.: US 7,240,013 B2
(45) Date of Patent: Jul. 3, 2007

(54) METHOD AND APPARATUS FOR CONTROLLING BUFFERING OF AUDIO STREAM

(75) Inventors: Sang-uk Kang, Anyang-si (KR); Dae-gyu Bae, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 905 days.

(21) Appl. No.: 10/337,278

(22) Filed: Jan. 7, 2003

(65) Prior Publication Data

US 2003/0208359 A1    Nov. 6, 2003

(30) Foreign Application Priority Data

May 4, 2002    (KR) .................... 10-2002-0024600

(51) Int. Cl.
*G10L 21/00* (2006.01)
(52) U.S. Cl. .................................. 704/500; 348/423.1
(58) Field of Classification Search ................ 704/500; 348/423.1
See application file for complete search history.

(56) References Cited

U.S. PATENT DOCUMENTS 6,516,005 B1 *  2/2003  Murayama et al. ......... 370/503

FOREIGN PATENT DOCUMENTS

| JP | 7-30886 A | | 1/1995 |
|---|---|---|---|
| JP | 7-38857 A | | 2/1995 |
| JP | 10-271482 | * | 10/1998 |
| JP | 10-271482 A | | 10/1998 |
| JP | 2000-224580 A | | 8/2000 |
| JP | 2000-308012 A | | 11/2000 |
| KR | 1995-0035449 | * | 12/1995 |
| KR | 1995-0035449 A | | 12/1995 |

* cited by examiner

*Primary Examiner*—Daniel Abebe
(74) *Attorney, Agent, or Firm*—Sughrue Mion, PLLC

(57) ABSTRACT

A method and apparatus for controlling buffering of an audio stream so that audio can be played continuously without stoppage using a minimum amount of buffering are provided. The method for controlling buffering of data includes (a) determining a buffering period of compressed audio data on the basis of a time stamp which corresponds to a packet division unit, by considering the state of a network, (b) calculating a time period where the compressed audio data is to be stored in a buffer, on the basis of the buffering period that is determined in step (a), (c) buffering the inputted compressed audio data in a decoding buffer for the time period that is calculated in step (b), and (d) decoding the compressed audio data that is stored in the decoding buffer when the time period passes in step (c) and storing the decoded audio data in a composition buffer for synchronization with video data.

9 Claims, 2 Drawing Sheets

METHOD AND APPARATUS FOR CONTROLLING BUFFERING OF AUDIO STREAM

BACKGROUND OF THE INVENTION

This application claims the priority of Korean Patent Application No. 2002-24600 filed May 4, 2002, the disclosure of which is incorporated herein in its entirety by reference.

FIELD OF THE INVENTION

The present invention relates to a system for controlling buffering of digital audio, and more particularly, to a method and apparatus for controlling buffering of an audio stream so that audio can be played continuously without stoppage of a minimum amount of buffering.

DESCRIPTION OF THE RELATED ART

In general, the human ears are sensitive to stoppages in an audio stream during audio playback. In order to prevent stoppage of the audio stream, an audio player performs buffering at a buffer terminal.

A conventional audio player controls buffering of audio data in a composition buffer for storing restored audio data. However, since a method for controlling buffering performed by the conventional composition buffer relates to decoded audio data, a large amount of memory is needed, and a delay time of a signal caused by the large amount of memory increases.

SUMMARY OF THE INVENTION

To solve the above and other problems, it is an aspect of the present invention to provide a method and apparatus for controlling buffering of an audio stream which are able to reduce stoppage of audio using a minimum amount of memory, in which buffering is controlled by a conventional composition buffer for storing restored audio data is controlled by a decoder buffer for storing compressed audio data.

Accordingly, to achieve the above aspect, according to one aspect of the present invention, there is provided a method for controlling buffering of data. The method comprises (a) determining a buffering period of compressed audio data on the basis of a time stamp which corresponds to a packet division unit, by considering the state of a network, (b) calculating a time period where the compressed audio data is to be stored in a buffer, on the basis of the buffering period determined in step (a), (c) buffering the inputted compressed audio data in a decoding buffer for the time period calculated in step (b), and (d) decoding the compressed audio data stored in the decoding buffer when the buffering period passes in step (c) and storing the decoded audio data in a composition buffer for synchronization with video data.

To achieve the above aspect, according to another aspect of the present invention, there is provided an apparatus for controlling buffering of data. The apparatus includes a parsing unit which receives an audio stream from a network and divides the received audio stream into a header and compressed audio data, a decoding buffer which stores the compressed audio data that is divided by the parsing unit, a decoder which restores the audio data that is stored in the decoding buffer, a composition buffer which stores the audio data that is restored by the decoder, a sound card buffer which stores the audio data that is stored in the composition buffer to play the audio data, and a controller which calculates a time period that is to be stored in the decoding buffer based on a buffering period determined on the basis of a time stamp, buffers the audio data in the decoding buffer for the time period, decodes the audio data and stores the audio data in the composition buffer when the buffering period of the decoding buffer passes, and outputs the audio data that is stored in the composition buffer to the sound card buffer by referring to the time stamp in the header information that is divided by the parsing unit.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

The structure and operation of the present invention will be described in detail hereinafter with reference to the accompanying drawings.

Figure 1:
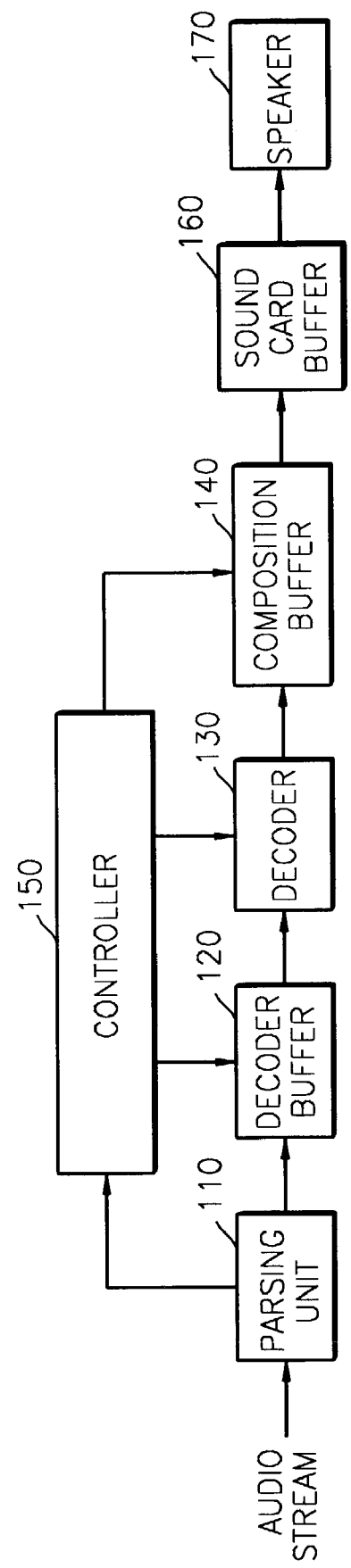
FIG. 1 shows a block diagram of an apparatus for controlling buffering of an audio stream according to the present invention.

FIG. 1 shows a block diagram of an apparatus for controlling buffering of an audio stream according to the present invention. Referring to FIG. 1, the apparatus for controlling buffering of an audio stream includes a parsing unit 110, a decoder buffer 120, a decoder 130, a composition buffer 140, a controller 150, a sound card buffer 160, and a speaker 170.

Hereinafter, the apparatus for controlling buffering of an audio stream will be described with reference to FIG. 1.

First, a program provider provides an audio stream in units of compressed packets in an AC3 or MP3 format via a network or file. The audio stream is comprised of a header and audio data, wherein the header includes synchronization information such as a time stamp. All audio packets are access units having the same time unit and are divided into composition time stamps.

The parsing unit 110 receives an audio stream from a network (not shown) and separates the received audio stream into a header and compressed audio data.

The decoder buffer 120 buffers the compressed audio data separated by the parsing unit 110 for a predetermined time period. The predetermined time period is obtained by subtracting both a decoding time of the decoder 130 and a delay time of the sound card buffer 160 from a buffering period.

The decoder 130 decodes the compressed audio data that is stored in the decoder buffer 120.

The composition buffer 140 stores the decoded audio data received from the decoder 130 for synchronization with video data or other source data.

The sound card buffer 160 stores the audio data stored in the composition buffer 140 on the basis of time stamp information generated by the controller 150.

The controller 150 calculates a time period to be stored in the decoder buffer 120 based on a buffering period determined on the basis of a time stamp detected by the parsing unit 110. Under the control of the controller 150, the audio data is buffered in the decoder buffer 120 for the time period and output to the decoder 130 when the data storage time of the decoder buffer 120 passes. Further, under the control of the controller 150, decoding is performed by the decoder 130, the decoded audio data is buffered in the composition buffer 140, and the audio data stored in the composition buffer 140 is output to the sound card buffer 160 by referring to the time stamp detected by the parsing unit 110. Finally, the audio data stored in the sound card buffer 160 is transmitted to a sound card (not shown) and played through the speaker 170.

Figure 2:
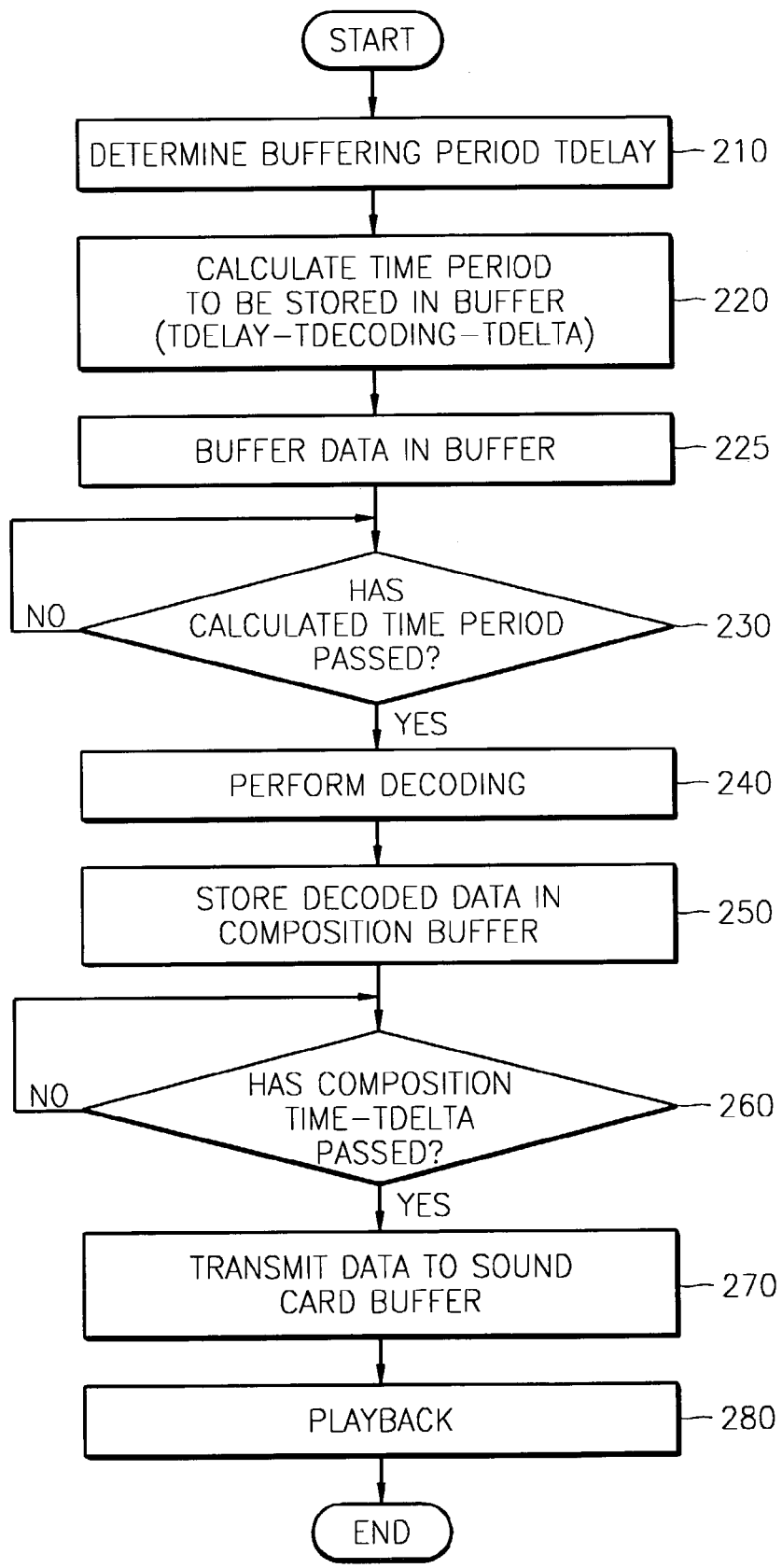
FIG. 2 shows a flowchart illustrating a method for controlling buffering of an audio stream according to the present invention.

FIG. 2 shows a flowchart illustrating a method for controlling buffering of an audio stream according to the present invention.

It is assumed that a composition time stamp is Tcts, a buffering period is Tdelay, a time delayed in the sound card buffer 160 is Tdelta, and a maximum decoding time is Tdecoding. In all digital audio compression methods, sampled data is compressed for a predetermined time period. Thus, a playback time can be calculated by multiplying the number of access units by their durations. In addition, since the decoder buffer 120 stores compressed audio data, the size of the decoder buffer 120 is much smaller than that of the composition buffer 140 for the same time period.

In step 210, a buffering period Tdelay is determined by considering the state of a network and on the basis of a point in time which corresponds to a composition time stamp Tcts. As a result, the number of access units to be buffered by the decoder buffer 120 is determined.

In step 220, the time period for which audio data is to be stored in the decoder buffer 120 is calculated on the basis of the determined buffering period Tdelay. That is, the time period to be stored in the decoder buffer 120 is obtained by subtracting both the decoding time Tdecoding of the decoder 130 and the delay time Tdelta of the sound card buffer 160 from the buffering period Tdelay.

In steps 225 and 230, the decoder buffer 120 buffers compressed audio data inputted via a network until the calculated time period passes.

When the buffering period of the compressed audio data that is buffered by the decoder buffer 120 exceeds the calculated time period, the compressed audio data is outputted to the decoder 130.

In step 240, the decoder 130 decodes the compressed audio data that is inputted from the decoder buffer 120.

In step 250, the decoded audio data is stored in the composition buffer 140 for synchronization with other data such as video data. In this case, a time stored in the composition buffer 140 is the sum of an actual time which corresponds to the composition time stamp and ((Tdecoding−actual decoding time)+Tdelta).

In step 260, it is checked whether an audio data storage time of the composition buffer 140 exceeds a time obtained by subtracting the delay time Tdelta of the sound card buffer 160 from a time Tcts of the composition time stamp.

In this case, when the audio data storage time of the composition buffer 140 exceeds a time obtained by subtracting the delay time Tdelta of the sound card buffer 160 from the time Tcts of the composition time stamp, the audio data is transmitted to the sound card buffer 160 in step 270.

In step 280, the audio data stored in the sound card buffer 160 is played back according to a sampling rate. In this case, the audio data stored in the sound card buffer 160 should be played as soon as one access unit is in a standby state and then an access unit that is being presently played ends, and thus a buffer for at least two access units is necessary.

As described above, in the method and apparatus for controlling buffering of an audio stream according to the present invention, buffering controlled by a conventional composition buffer for storing restored audio data is controlled by a decoder buffer for storing compressed audio data, thereby reducing stoppage of audio using a minimum amount of memory.

The present invention is not limited the above-mentioned embodiment but it will be understood by those skilled in the art that various changes in form and details may be made therein without departing from the spirit and scope of the invention. For example, the present invention can be applied to control buffering of a video stream.

What is claimed is:

1. A method for controlling buffering of data, the method comprising:
   (a) determining a buffering period of compressed audio data on the basis of a time stamp corresponding to a packet division unit by considering a state of a network;
   (b) calculating a time period for which the compressed audio data is to be stored in a decoding buffer, on the basis of the buffering period;
   (c) storing the compressed audio data in the decoding buffer for the time period; and
   (d) decoding the compressed audio data stored in the decoding buffer when the time period passes and storing the decoded audio data in a composition buffer for synchronization with video data.

2. The method of claim 1, wherein the time period for which the compressed audio data is to be stored in the decoding buffer is obtained by subtracting both a decoding time of the decoder and a delay time of a sound card buffer from the buffering period.

3. The method of claim 1, wherein in step (d), the decoded audio data is stored in the composition buffer for a storage time corresponding to the sum of a time corresponding to the time stamp and a time corresponding to ((a maximum decoding time of the decoder−an actual decoding time of the decoder)+a delay time of a sound card buffer).

4. The method of claim 1, further comprising (e) storing in a sound card buffer the decoded audio data stored in the decomposition buffer by referring to the time stamp.

5. The method of claim 4, wherein the decoded audio data is stored in the sound card buffer for a time corresponding to a difference between the time stamp and a delay time of the sound card buffer.

6. An apparatus for controlling buffering of data, the apparatus comprising:
   a parsing unit which receives an audio stream from a network and separates the received audio stream into a header and compressed audio data;
   a decoding buffer which stores the compressed audio data separated by the parsing unit;
   a decoder which decodes the audio data stored in the decoding buffer;
   a composition buffer which stores the audio data decoded by the decoder;
   a sound card buffer which stores the audio data stored in the composition buffer in order to play the audio data; and
   a controller which calculates a time period for which the compressed audio data is to be stored in the decoding buffer based on a buffering period determined on the basis of a time stamp in the header information, wherein the controller controls the decoding buffer, the decoder and the composition buffer so that the decoding buffer stores the audio data for the time period, the decoder decodes the audio data stored in the decoding buffer when the time period passes, and the composition buffer stores the audio data decoded by the decoder and outputs the audio data to the sound card buffer based on the time stamp in the header information separated by the parsing unit.

7. The apparatus of claim 6, wherein the time period for which the compressed audio data is to be stored in the decoding buffer is obtained by subtracting both a decoding time of the decoder and a delay time of a sound card buffer from the buffering period.

8. The apparatus of claim 6, wherein the decoded audio data is stored in the composition buffer for a storage time corresponding to the sum of a time corresponding to the time stamp and a time corresponding to ((a maximum decoding time of the decoder−an actual decoding time of the decoder)+a delay time of a sound card buffer).

9. The apparatus of claim 6, wherein the decoded audio data is stored in the sound card buffer for a time corresponding to a difference between the time stamp and a delay time of the sound card buffer.

* * * * *